Dec. 15, 1936.　　C. E. POWELL ET AL　　2,064,765
AUTOMATIC LIFT VALVE
Filed Aug. 19, 1932　　4 Sheets-Sheet 1

Inventors.
Clarence E. Powell,
John W. Force and
Frank W. Ofeldt,
by Edward A. Lawrence
their attorney.

Dec. 15, 1936.  C. E. POWELL ET AL  2,064,765
AUTOMATIC LIFT VALVE
Filed Aug. 19, 1932  4 Sheets-Sheet 2

INVENTORS

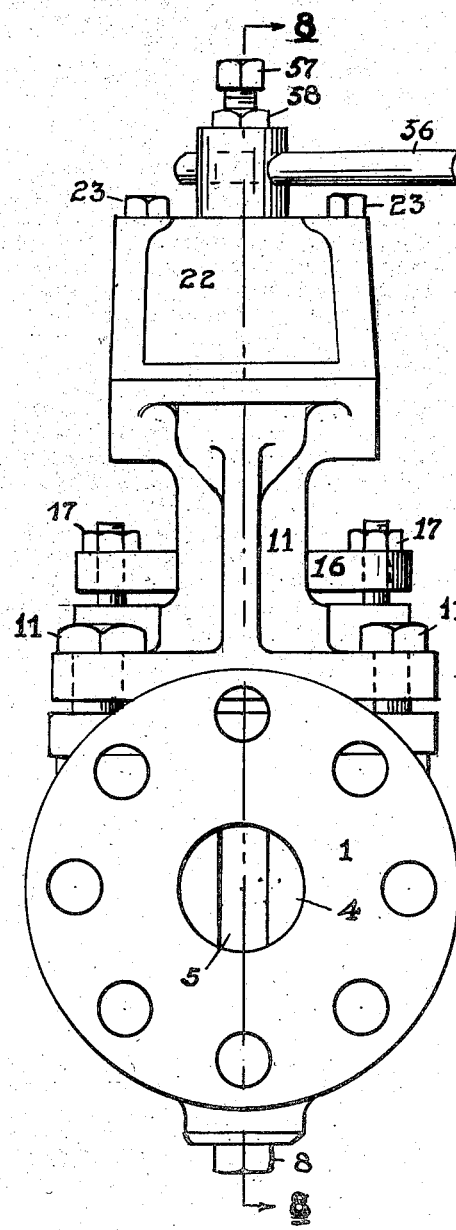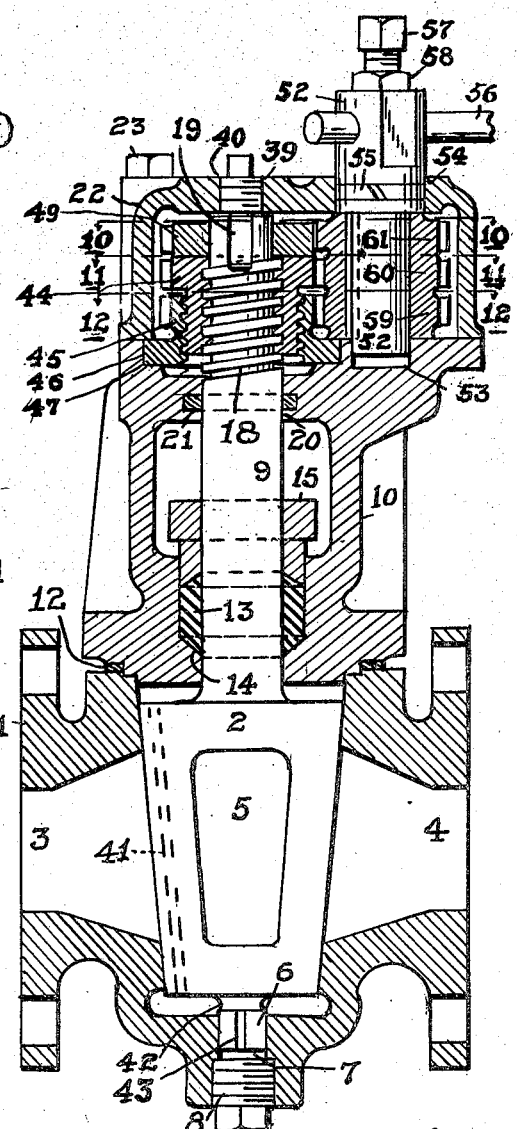

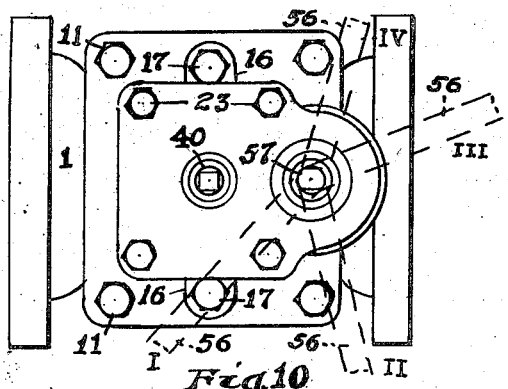
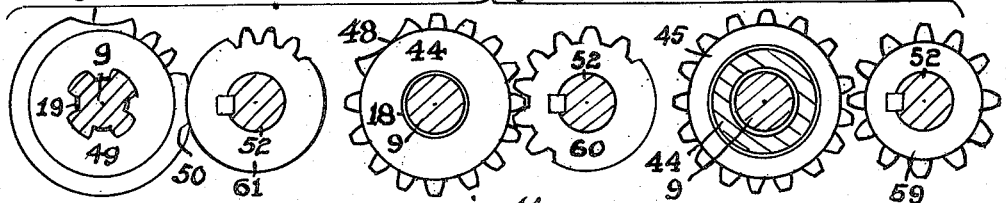
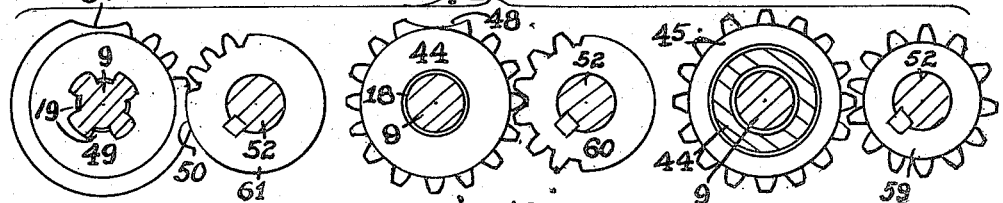
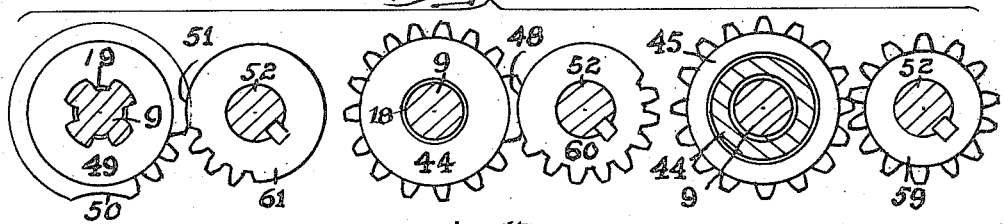
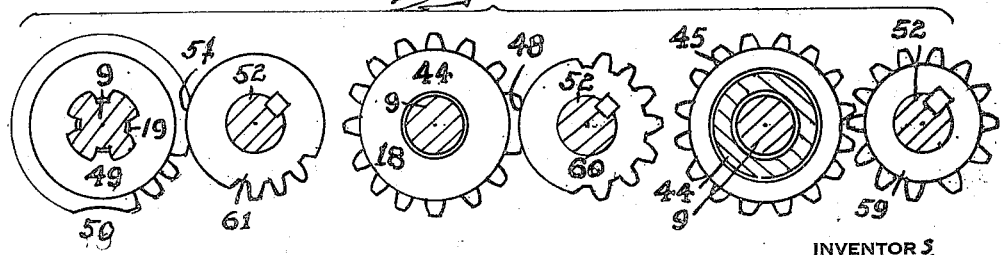

Patented Dec. 15, 1936

2,064,765

UNITED STATES PATENT OFFICE

2,064,765

AUTOMATIC LIFT VALVE

Clarence E. Powell, Emsworth, John W. Force, Aliquippa, and Frank W. Ofeldt, McKeesport, Pa., assignors to Homestead Valve Manufacturing Company, Coraopolis, Pa., a corporation of Pennsylvania Application August 19, 1932, Serial No. 629,408

3 Claims. (Cl. 251—97)

Our invention is applicable to all types of lift valves.

A novel and characteristic feature of our invention is the employment of gears for the purpose of imparting to the valve member the required rotary movements and also for seating and unseating the member.

Another novel and preferred feature of our invention is the provision of practical means whereby the turning of the valve member and its seating or unseating is effected by one angular movement of the handle or other operating means.

In the preferred embodiment of our invention we employ a gear arrangement for these purposes comprising intermittent gears.

In our preferred embodiment we employ locking means, preferably of the Geneva type between intermittent gears, for locking the valve member against rotation while it is being unseated or seated, and also for locking the valve member against axial movement while turning.

Another novel and preferred feature of our invention is the removal of the operating mechanism from the interior of the valve proper and placing it in a separate enclosure. Thus we prevent impurities, foreign material or other deleterious substances from reaching and doing injury to the mechanism. This arrangement also provides for better lubrication without danger of the lubricant entering the interior of the valve.

Other objects and other novel features of construction and arrangement of parts will appear from the following description.

In the accompanying drawings wherein we have illustrated a practical embodiment of the principles of our invention, Fig. 1 is an end elevation of a valve arranged for rotary movement and for seating in one position.

Fig. 7 is an elevation showing the principle of our invention applied to a rotary valve wherein the valve member is to be seated in two positions.

Fig. 8 is a vertical section taken along the line 8—8 in Fig. 7, showing the valve closed and the valve plug seated.

Fig. 9 is a top plan view of the valve shown in Fig. 7, the handle being illustrated in four positions.

Fig. 10 is a diagrammatic view showing the relative position of the gears when the valve is closed and the valve member is seated, the intermittent gears being illustrated in plan along the line 10—10 in Fig. 8, the inner threaded gears along the line 11—11 in Fig. 8, and the outer threaded gears along the line 12—12 in Fig. 8.

Fig. 11 is a like view illustrating the relative positions of the gears with the valve still closed but the valve member unseated.

Figure 1:
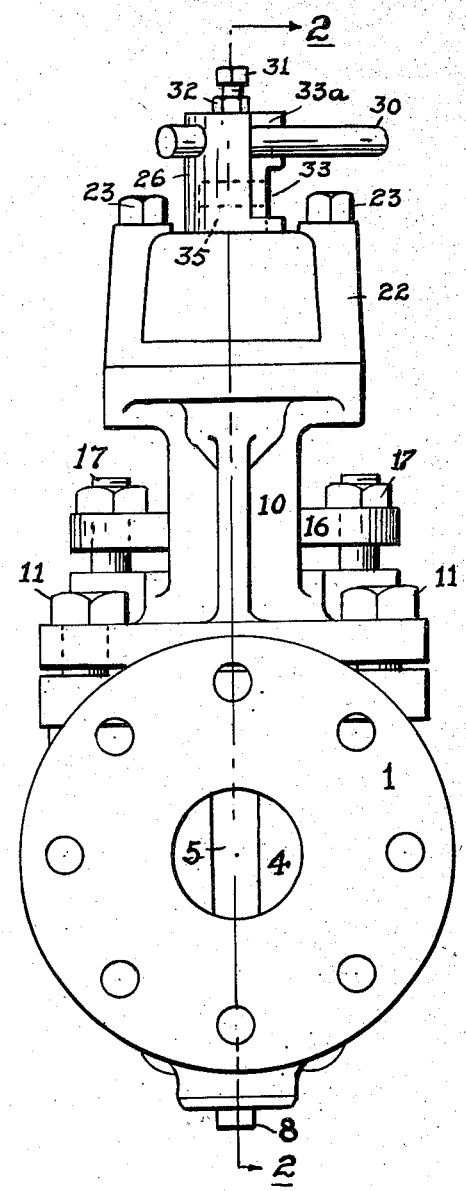
Figure 2:
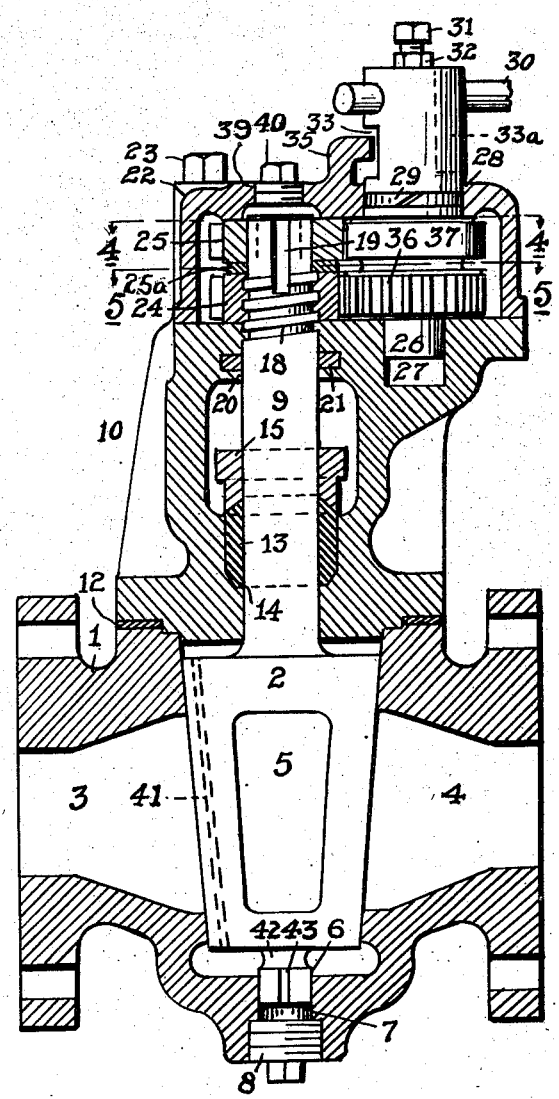
Fig. 2 is a vertical section taken along the line 2—2 in Fig. 1 showing the valve closed and the valve member seated.

Fig. 12 is a like view illustrating the relative positions of the gears with the valve member turned from its position in Fig. 2 and unseated.

Fig. 13 is a like view illustrating the relative positions of the gears with the valve member turned into its position in Fig. 12 but with the valve member seated in said position.

Referring first to Figs. 1 to 6, inclusive of the drawings, 1 represents the valve body which is illustrated as provided with a conical type seat for the valve member 2. The casing is provided with the ports 3 and 4. The valve member is provided with usual transverse passage 5.

The lower end of the valve member is provided with a cylindrical projection 6 which is journaled in the cylindrical socket 7 formed in the valve casing.

For convenience this socket may extend through the body of the casing and may be closed by the screw plug 8.

The valve member is provided with the outwardly or upwardly extending stem 9.

10 represents a yoke-type bonnet mounted on the valve body and secured in place by the bolts 11 with an interposed gasket 12 to insure a sealed joint. The stem 9 is sealed by any convenient means, as for instance by a packing box comprising the packing ring 13 surrounding the stem and compressed against the conical shoulder 14 of the bonnet by drawing down the gland 15 which is provided with a cross head 16, which in turn is clamped to the bonnet by the bolts and nuts 17.

The upper portion of the stem 9 is threaded as at 18, the thread being shown as a right hand thread. The upper extremity of the stem is splined as at 19. The threaded and splined portion of the stem extends above the bonnet 10 and the upper end of the bonnet is provided with a cylindrical bearing 20 in which the stem is journaled. 21 represents a packing ring contained in an annular seat in said bearing to obstruct the downward passage of lubricant along the same.

It is evident that the valve member is journaled at the top and bottom, and thus turns readily and is maintained free from misalinement.

22 is a gear box secured to the top of the bonnet, as by the bolts 23.

24 represents a gear having a threaded bore which is screwed on the thread 18 of the stem 9. The gear rests on a flat surface of the top of the bonnet.

25 represents a second gear splined to the upper extremity of the stem 9 so as to rotate in unison with said stem and to permit relative vertical movement between the gear 25 and the stem. Instead of being splined the upper end of the stem may be squared, key-wayed or merely flattened, to receive coacting surfaces of the gear 25. 25a represents a thrust washer interposed between the two gears.

The gear 25 is an intermittent or interrupted gear, the toothed arc being of proper length to provide for the desired angular movement of the valve member in opening and closing the valve.

26 represents an operating shaft disposed parallel to the stem 9 and having its lower end journaled in a step bearing 27 formed in the top wall of the bonnet 10, while its upper end, which is of enlarged diameter, protrudes through a bearing 28 in the top of the box 22. 29 is a packing ring seated in a groove in the shaft to obstruct the upward passage of lubricant through the bearing 28.

The upper end of the shaft 26 is transversely bored to receive the operating handle 30, which may be fixed relative to the shaft by means of the set-screw 31 and the lock-nut 32. The upper end of the shaft 26 may be squared or otherwise arranged for the application of a tool for rotating the shaft instead of the handle shown, or power-connection may be applied to the shaft in the use of heavy service valves.

The shaft 26 is provided with a circumferentially disposed recess 33 ending in a shoulder 34, and 35 is an angular stop bracket mounted on the top of the box and projecting into said recess, so that by the contact of said stop with the shoulder 34 the rotary movement of the shaft 26 may be limited. This stop is employed to limit the movement of the valve member in the opening direction only, as in the closing movement the outside positive stop is not desired because as wear takes place it is desirable that the handle will travel a little further to provide suitable compensation for wear and in this way the valve member will always have positive seating.

To permit the gear gox to be placed in position, the shaft 26 is recessed downwardly from its upper end, as illustrated at 33a to the recess 33, thus providing clearance for the stop 35.

36 and 37 represent a pair of gears fixed on the shaft 26 within the box 22. The gears conveniently may be formed as a double gear, as shown in Fig. 2, and are keyed or otherwise fixed to the shaft.

The gears 24 and 36 are continuously in mesh but need not be provided with teeth throughout their entire perimetral surfaces but only for their arcs of movement. The gear 37 is an intermittent gear arranged to mesh with the intermittent gear 25.

The gear 25 is preferably provided at one end of its toothed perimetral portion with a Geneva lock comprising the recess 38 which is engaged by the untoothed perimetral portion of the gear 37 while the valve member is being unseated or seated, thus locking the gear 25 and the valve member against turning during the axial movement of the latter.

Figure 3:
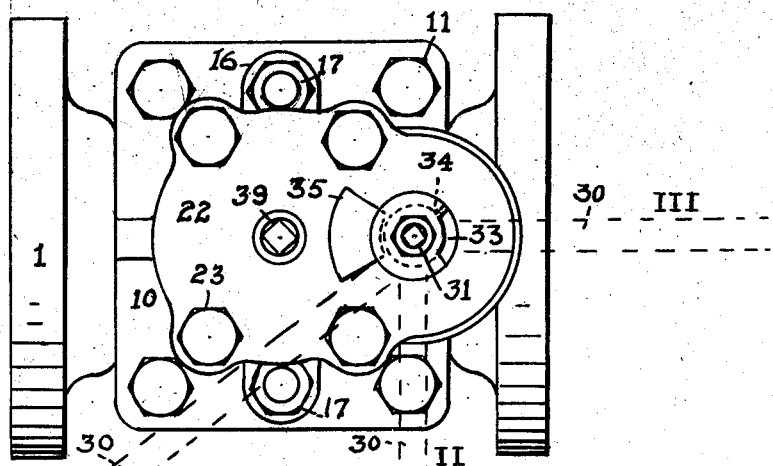
Fig. 3 is a top plan view of the valve, the handle being illustrated in three positions.

In Fig. 3 I have illustrated in dotted lines three positions of the handle 30, at I, II and III, the handle moving from I to III in opening the valve and clockwise from III to I in closing the valve.

Figure 4:
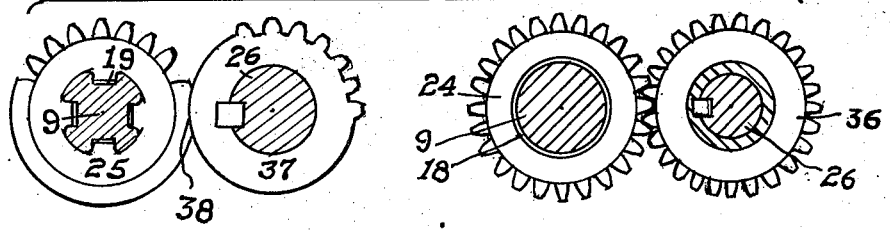
Fig. 4 is a diagrammatic view showing the relative positions of the gears when the valve is closed and the valve member seated, as in Fig. 2, the intermittent gears being shown in plan along the line 4—4 in Fig. 2 and the complete gears shown along the line 5—5 in Fig. 2.

Assuming the handle to occupy position I with the valve closed and the valve member seated, the relative positions of the gears are as illustrated in Fig. 4, the gears 24 and 36 being meshed together, while the gears 25 and 37 are out of mesh and the gear 25 locked against rotation by the engagement of its Geneva recess 38 with the perimetral edge of the gear 37, thus preventing the rotation of the valve member.

Thus if the handle be now moved toward position II, the gears 36 and 37 will rotate with the shaft 26 and the gear 36 will rotate the gear 24 which will tend to descend the thread 18 and by bearing down on the bonnet, raising or unseating the valve member.

Figure 5:
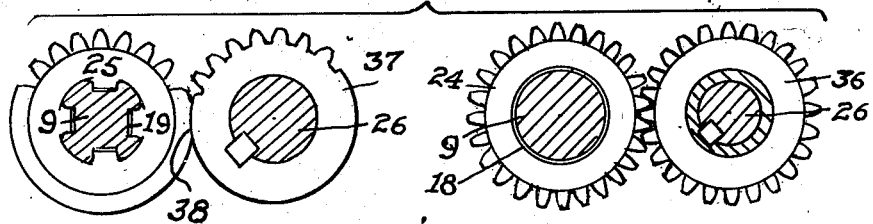
Fig. 5 is a like view with the valve closed and the valve member lifted and ready for rotation.
Figure 6:
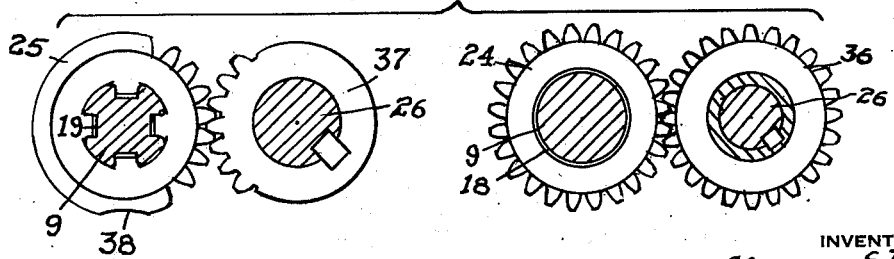
Fig. 6 is a like view with the valve member lifted and turned into its open position.

As the movement of the handle is continued, the teeth of the rotating gear 37 will pick up the teeth of the gear 25, as is shown about to occur in Fig. 5 and as having occurred in Fig. 6, and thus the gear 25 and the unseated valve member will start to turn.

The gears 24 and 25 are now rotating in unison, and as there is no relative movement between the valve stem and the gear 24, there is no axial movement of the valve member.

This opening movement of the valve member is continued until the stop 35 engages the shoulder 34 at the end of the recess 33, the intermittent gears 25 and 37 remaining in mesh.

When the valve is to be closed the handle 30 is moved clockwise from position III to I, and as long as the gears 25 and 37 are in mesh, as illustrated in Fig. 6, the valve member is rotated but not moved axially, since the stem 9 and the gear 24 are rotating together.

As the gears 25 and 37 move past their relative positions, illustrated in Fig. 5 and become unmeshed, the recess 38 of the gear 25 is engaged by the perimetral surface of the gear 37, thus locking the gear 25 against rotation and thus halting the rotation of the valve member, while the gears 24 and 36 maintain their meshed engagement, so that there is now relative movement between the gear 24 and the stem 9, the gear tending to climb the stem, thus positively forcing the valve member into its seat.

The top of the gear box 22 is provided with a threaded opening 39 which is normally closed by a plug 40. Thus the gear box may be readily filled with suitable lubricant.

The valve member 2 is preferably provided with a longitudinal passage 41 so that the pressure will be equalized at either end of the valve member and by means of the reduced neck 42 and the longitudinal groove 43 in the journal 6, the pressure is also equalized in the bearing 7.

It will be noted that the gear box has no communication with the body of the valve but it provides a separate enclosure wherein the gears are housed and wherein they may readily be maintained in a properly lubricated condition and wherein they are completely protected from contact with the liquids or gases passing through the body of the valve. If desired the gears may be unenclosed or may be placed inside the valve body as for instance where lubricants are passing through the valve.

Referring now to Figs. 7 to 13 of the drawings, the features thereof which also appear in the preceding views are indicated by the same reference numerals.

The following are features peculiar to Figs. 7 to 13, inclusive. 44 represents a threaded gear having a right hand thread in its bore by means of which it is screwed on the thread 18 of the stem 9, and also a left hand exterior thread on its reduced outer diameter. 45 represents a second threaded gear having its bore provided with a left hand thread so as to screw on the gear 44.

The lower portion of the second threaded gear 45 is provided with a circumferentially disposed shoulder 46 which works in an annular recess 47 in the top surface of the bonnet 10 and the bottom edge of the box 22 overlaps said shoulder, thus preventing vertical movement of the gear 45.

The upper portion of the gear 44, which overhangs the gear 45, has its perimetral surface provided with a series of gear teeth interrupted by the Geneva lock recess 48.

49 represents a third gear which is splined on the upper end of the stem 9 with the provision for limited relative vertical movement between the stem and the gear. Instead of being splined the upper end of the stem may be squared, keywayed or merely flattened, to receive coacting surfaces of the gear 49.

The gear 49 is of the intermittent type, the toothed arc being of the proper length to give the desired turning movement of the valve member. At either end of the toothed portion of the gear 49 a Geneva lock recess is provided, as shown at 50 and 51 in Figs. 10, 11, 12 and 13.

52 represents an operating shaft disposed parallel with the stem 9 and having its lower end journaled in a step bearing 53 formed in the top wall of the bonnet 10, while its upper end which is of enlarged diameter protrudes through a bearing 54 in the top of the box 22. 55 is a packing ring seated in a groove in the shaft to obstruct the upward passage of lubricant through the bearing 54.

The upper end of the shaft 52 is transversely bored to receive the operating handle 56 which may be fixed relative to the shaft by means of the set-screw 57 and the lock-nut 58. The upper end of the shaft may be squared or otherwise arranged for the application of a tool for rotating the shaft instead of the handle, or power-connection may be applied to the shaft in the case of heavy service valves.

59, 60 and 61 represent three gears fixed on the shaft within the gear box. These gears have the same pitch diameter and move in unison and thus may be conveniently made in one piece and be keyed to the shaft.

The gears 59 and 45 are continuously in mesh but may be provided with teeth only throughout their arcs of movement.

The gear 60 is arranged to mesh with the gear 44 and is an intermittent gear, the arc of its toothed portion being of sufficient length to provide the desired axial movement of the valve member in unseating and seating.

The gear 61 is arranged to mesh with the gear 49 and is also an intermittent gear and the arc of its toothed portion is of the proper length to produce the desired rotary movement of the valve member.

In Fig. 9 I have illustrated in dotted lines at I, II, III and IV, four positions of the handle 56. At I the handle is in the position it occupies when the valve is closed and the valve member is seated, as also shown in Fig. 8, the gears having the relative positions diagrammatically indicated in Fig. 10. At position II the handle is in its position with the valve still closed but the valve member unseated and the gears having the relative positions indicated in Fig. 11. At position III of the handle the unseated valve member has been turned into its second position of rotary movement with the gears arranged as indicated in Fig. 12. At position IV of the handle the turned plug is seated in its second position with the gears relatively positioned as in Fig. 13. The movement of the handle in opening is assumed to be counterclockwise, as is usual in rotary valve practice.

When the valve is closed and the valve member seated, position I of the handle, the lock recess 50 of the gear 49 is engaged by the untoothed perimetral surface of the gear 61, as shown in Fig. 10, so that as the gear 61 rotates with the shaft 52 the gear 49 is not rotated but is locked stationary. Thus the valve member is prevented from turning while the Geneva lock is in operation. Moreover the gears 44 and 60 are in mesh so that a counterclockwise rotation of the shaft 52 will tend to screw the gear 44 down on the stem 9, thus tending to raise and unseat the plug. The gears 45 and 59 are continuously in mesh and therefore the counterclockwise rotation of the shaft 52 will cause the gear 45 to rotate in unison with the gear 44. As the gear 45 is held against vertical movement the rotation of the gears 44 and 45 causes the elevation and unseating of the valve member.

Referring now to Fig. 11, as the handle attains position II the teeth of gear 61 pick up those of gear 49 so that the latter gear is now rotated, thus rotating the unseated valve member.

The gears 44 and 60 and the gears 45 and 59 are respectively in mesh. However, as the valve member is rotating in the same direction as are the gears 44 and 45 and all the gears on the stem 9 have the same pitch diameter, there is no longer relative movement between the stem and the gears so that no further axial movement of the valve member occurs but the unseated valve member is now rotated without axial movement.

As the handle attains position III the rotary movement of the valve member ends and the gears are in the relative positions illustrated in Fig. 12. It is seen that the toothed portion of the two gears 49 and 61 have rotated out of engagement and the perimetral recess 51 of the gear 49 is now engaged by the untoothed perimetral surface of the gear 61, thus locking the valve member against further rotation in the direction in which it has just been turned. The perimetral recess 48 of the gear 44 is now engaged by the untoothed portion of the gear 60, while the gears 45 and 59 remain in mesh. Thus the threaded gear 44 is locked against rotation while the threaded gear 45 tends to climb the former. Thus as the handle moves to position IV, the gear 45 being positively held against vertical movement, the plug is depressed and seated. In seating the valve member the handle is turned until the valve member is crowded down, thus insuring proper seating.

During a reverse or clockwise movement of the handle from position IV to position I the action is as follows.

Between positions IV and III the valve member remains locked against rotary movement by the Geneva lock effective between gears 49 and 61 and the gear 44 is locked against rotation by the Geneva lock effective between gears 44 and 60. Thus as the gear 45 is rotated it tends to descend the stem 9 and thus unseats the valve member.

As the handle reaches position III and the gears attain their relative positions illustrated in Fig. 12, the teeth of gear 61 pick up those of gear 49 and thus the valve member is turned towards its original or closed position. Meanwhile the teeth of gear 60 pick up the teeth of gear 44 and the latter rotates in unison with the gear 45 and consequently there is no relative movement between the stem 9 and the gear 44. Therefore the elevation of the valve member ceases and the motion of the valve member is rotary only.

As the clockwise movement of the handle continues toward position II the valve member is turned into its proper position for reseating and the recess 50 of the gear 49 is engaged by the untoothed perimetral edge of the gear 61, thus halting the rotary movement of the plug and locking it against further rotation. Since the gears 44 and 60 are in mesh, the threaded gears 44 and 45 again move in unison, the gear 44 tending to climb the stem of the plug, so that while the handle moves from position II to I the plug is reseated, the necessary movement of the handle being employed to crowd the valve member down snugly into its seat.

In both embodiments of the principles of our invention illustrated in the drawings the unseating of the valve member, the rotation of the valve member in either direction and the seating of the valve member are all accomplished by positive mechanical means of simplified and sturdy construction, the employment of ratchets, spring-actuated fingers or movable keys being avoided. Again the operation of unseating, rotating and seating in either direction is accomplished by one angular movement of the handle or other force-applier. It is obvious, however, that rotative and axial or other seating and unseating movements of the valve member may be caused to occur at the same time.

For the sake of clearness in description we have illustrated the principles of our invention applied to a two-way valve, but it is obvious to those skilled in the art that our invention is applicable with equal advantage to three-way valves, four-way valves, angle-valves and other multiple-way valves.

In the embodiment of the principles of our invention illustrated in the drawings, we have shown the gears mounted on the stem of the valve member as having the same pitch diameters and also the gears on the operating shaft having the same pitch diameters, but these pitch diameters may be different without departing from the principles of our invention. Thus the pitch diameter of any of the gears may be varied depending upon its use and requirements.

By obvious modifications of our arrangement of gears, provision may be made for seating and unseating at one or more stages or part-turns from one extreme position of the valve member to the other.

We claim:—

1. In means for imparting rotary and axial movements to the valve member of a lift valve, said valve member being provided with a threaded portion, the combination of a threaded gear screwed on said threaded portion, a second gear rotating with the valve member, a third gear threaded and screwed on the first named gear on a thread the reverse of that on the valve member, and driving means meshing with the three gears, the third named gear being continuously in mesh with the driving means while the first and second named gears are intermittently in mesh with said driving means.

2. In means for imparting rotary and axial movements to the valve member of a lift valve, said valve member being provided with a threaded portion, the combination of a threaded gear screwed on said threaded portion, a second gear rotating with the valve member, a third gear threaded and screwed on the first named gear on a thread the reverse of that on the valve member, driving means meshing with the three gears, the third named gear being continuously in mesh with the driving means while the first and second named gears are intermittently in mesh with said driving means, and means for locking said second and third named gears against movement when out of mesh.

3. In means for imparting rotary and axial movements to the valve member of a lift valve, said valve member being provided with a threaded portion, the combination of a threaded gear screwed on said threaded portion, a second gear rotating with the valve member, a third gear threaded and screwed on the first named gear on a thread the reverse of that on the valve member, driving means meshing with the three gears, the third named gear being continuously in mesh with the driving means while the first and second named gears are intermittently in mesh with said driving means, and Geneva means for locking said second and third named gears against movement when out of mesh.

CLARENCE E. POWELL.
JOHN W. FORCE.
FRANK W. OFELDT.